(12) United States Patent
Harada et al.

(10) Patent No.: US 10,816,092 B2
(45) Date of Patent: Oct. 27, 2020

(54) HYDRAULIC CONTROL DEVICE INCLUDING FIRST AND SECOND HYDRAULIC SENSORS

(71) Applicant: HONDA MOTOR CO., LTD., Minato-ku, Tokyo (JP)

(72) Inventors: Masamichi Harada, Wako (JP); Keiichi Nishiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 178 days.

(21) Appl. No.: 16/056,624

(22) Filed: Aug. 7, 2018

(65) Prior Publication Data
US 2019/0049001 A1 Feb. 14, 2019

(30) Foreign Application Priority Data

Aug. 10, 2017 (JP) .................................. 2017-155242

(51) Int. Cl.
*F16H 61/12* (2010.01)
*G01L 15/00* (2006.01)
(Continued)

(52) U.S. Cl.
CPC ........... *F16H 61/12* (2013.01); *F15B 19/005* (2013.01); *F16H 61/0031* (2013.01);
(Continued)

(58) Field of Classification Search
None
See application file for complete search history.

(56) References Cited

U.S. PATENT DOCUMENTS 5,527,156 A * 6/1996 Song .................... E02F 9/2246
417/2
7,849,685 B2 * 12/2010 Yamazaki ............. E02F 9/2214
60/403
(Continued)

FOREIGN PATENT DOCUMENTS

CN 103306964 9/2013
JP 2005-351426 12/2005
(Continued)

OTHER PUBLICATIONS

Chinese Office Action and search report for Chinese Patent Application No. 201810912106.7 dated Nov. 27, 2019.
(Continued)

*Primary Examiner* — Natalie Huls
*Assistant Examiner* — Jermaine L Jenkins
(74) *Attorney, Agent, or Firm* — Amin, Turocy & Watson, LLP

(57) ABSTRACT

A comparison determination unit of a hydraulic control device determines whether a characteristic abnormality occurs in at least one hydraulic sensor of an output pressure sensor and a lateral pressure sensor by comparing an output pressure detected by the output pressure sensor and a lateral pressure detected by the lateral pressure sensor. An individual determination unit determines whether the characteristic abnormality occurs in the hydraulic sensor as a determination target by individually determining whether the output pressure and the lateral pressure are out of a predetermined range. A characteristic abnormality detection unit determines the hydraulic sensor in which the characteristic abnormality occurs by using each determination result in the comparison determination unit and the individual determination unit.

4 Claims, 8 Drawing Sheets

(51) Int. Cl.
  *F16H 61/00* (2006.01)
  *F15B 19/00* (2006.01)
  *G01L 27/00* (2006.01)
  *F16H 61/02* (2006.01)
  *F15B 11/17* (2006.01)

(52) U.S. Cl.
  CPC .......... *F16H 61/0206* (2013.01); *G01L 15/00* (2013.01); *G01L 27/007* (2013.01); *F15B 11/17* (2013.01); *F15B 2211/20576* (2013.01); *F15B 2211/87* (2013.01); *F16H 2061/1284* (2013.01)

(56) References Cited

U.S. PATENT DOCUMENTS

| | | | |
|---|---|---|---|
| 10,132,307 B2* | 11/2018 | Tomochika | G01P 5/14 |
| 10,400,889 B2* | 9/2019 | Igarashi | F15B 1/04 |
| 10,527,164 B2* | 1/2020 | Terai | F16H 61/12 |
| 2015/0316144 A1 | 11/2015 | Yoshitani et al. | |
| 2019/0178371 A1* | 6/2019 | Weinhardt | F15B 1/033 |

FOREIGN PATENT DOCUMENTS

| | | |
|---|---|---|
| JP | 2010-169210 | 8/2010 |
| JP | 2015-200369 | 11/2015 |
| JP | 2017-101765 | 6/2017 |
| WO | 2014/097345 | 6/2014 |

OTHER PUBLICATIONS

Japanese Office Action for Japanese Patent Application No. 2017-155242 dated Mar. 19, 2019.

* cited by examiner

HYDRAULIC CONTROL DEVICE INCLUDING FIRST AND SECOND HYDRAULIC SENSORS

CROSS-REFERENCE TO RELATED APPLICATION

This application is based upon and claims the benefit of priority from Japanese Patent Application No. 2017-155242 filed on Aug. 10, 2017, the contents of which are incorporated herein by reference.

BACKGROUND OF THE INVENTION

Field of the Invention

The present invention relates to a hydraulic control device that has, between a first pump and a hydraulic operation unit, a second pump and a check valve connected in parallel, and that supplies first oil from the first pump to the hydraulic operation unit through the check valve, or pressurizes the first oil with the second pump and supplies the first oil that has been pressurized to the hydraulic operation unit as second oil.

Description of the Related Art

For example, Japanese Laid-Open Patent Publication No. 2015-200369 discloses a hydraulic control device in a transmission of a vehicle that has, between a first pump (mechanical pump) and a hydraulic operation unit of the transmission, a second pump (electric pump) and a check valve connected in parallel. In this case, when an engine is started, first of all, first oil is supplied from the first pump to the hydraulic operation unit through the check valve. After that, the second pump is driven to pressurize the first oil that is supplied from the first pump with the second pump and supplies the first oil that is pressurized from the second pump to the hydraulic operation unit as second oil.

SUMMARY OF THE INVENTION

Incidentally, in order to supply oil at a desired flow rate and a desired pressure to a hydraulic operation unit, it is desirable that the pressure of first oil that is discharged from a first pump is detected by a first hydraulic sensor, the pressure of the oil that is supplied to the hydraulic operation unit is detected by a second hydraulic sensor, and the second pump is subjected to a feedback control by using the pressure detected by these hydraulic sensors as a feedback amount. In this case, if characteristic abnormality occurs in the first hydraulic sensor and/or the second hydraulic sensor, the second pump cannot be controlled as appropriate. The characteristic abnormality refers to a state in which a pressure value detected by the first hydraulic sensor and/or the second hydraulic sensor and an actual pressure value are different from each other by an allowable value or more.

Such a characteristic abnormality occurs due to the deterioration in durability or the product failure of the first hydraulic sensor and/or the second hydraulic sensor; therefore, it is not easy to detect the occurrence of the characteristic abnormality. In view of this, conventionally, by increasing the robustness in terms of hardware and software of the hydraulic control device, the influence of the characteristic abnormality on the control of the second pump is minimized.

The present invention is an improvement of the hydraulic control device according to Japanese Laid-Open Patent Publication No. 2015-200369, and an object is to provide a hydraulic control device that can detect the occurrence of a characteristic abnormality in a hydraulic sensor.

The present invention relates to a hydraulic control device including, between a first pump and a hydraulic operation unit of a transmission, a second pump and a check valve connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil.

In order to achieve the above object, the hydraulic control device includes a first hydraulic sensor provided between the first pump and the second pump and configured to detect a pressure of the first oil discharged from the first pump, a second hydraulic sensor provided between the second pump and the hydraulic operation unit and configured to detect a pressure of oil to be supplied to the hydraulic operation unit, and a comparison determination unit configured to determine whether a characteristic abnormality occurs in at least one hydraulic sensor of the first hydraulic sensor and the second hydraulic sensor by comparing the pressure value of the first oil detected by the first hydraulic sensor and the pressure value detected by the second hydraulic sensor.

Thus, it is possible to, for example, notify the occurrence of the characteristic abnormality in at least one hydraulic sensor to the outside, and request a repair.

The hydraulic control device may further include an individual determination unit configured to determine whether the characteristic abnormality occurs in the first hydraulic sensor or the second hydraulic sensor as a determination target by individually determining whether the pressure value detected by the first hydraulic sensor or the second hydraulic sensor is out of a predetermined range. Thus, the hydraulic sensor in which the characteristic abnormality occurs can be determined (detected) individually.

The hydraulic control device may further include a characteristic abnormality detection unit configured to determine the hydraulic sensor in which the characteristic abnormality occurs by using each determination result in the comparison determination unit and the individual determination unit. Thus, by performing the determination processes in the two determination units in order or at the same time in parallel, the hydraulic sensor in which the characteristic abnormality occurs can be specified (detected) quickly and certainly.

That is to say, in the determination using the detection result of one hydraulic sensor, it is necessary to set a wide threshold range for the determination process in consideration of the variation in determination accuracy. As a result, it is difficult to perform the correct determination unless the characteristic abnormality is relatively large.

On the other hand, by specifying the hydraulic sensor in which the characteristic abnormality occurs by combining two different determination methods (two determination processes for the characteristic abnormality), the threshold range set on the basis of the variation of the determination accuracy can be narrowed and the relatively small characteristic abnormality can be determined correctly.

In addition, the comparison determination unit and the individual determination unit may determine whether the characteristic abnormality occurs, in a case where the second pump rotates at an idling rotation number or the second pump is in a stop state.

In this case, if each hydraulic sensor operates normally and has approximately the same performance, the pressure of the first oil detected by the first hydraulic sensor becomes a hydraulic value that is large by the pressure loss in the hydraulic circuit as compared to the pressure of the oil detected by the second hydraulic sensor. Therefore, by performing the above determination process when the second pump idles or is in the stop state, the accuracy of the determination process can be increased and the hydraulic sensor in which the characteristic abnormality occurs can be determined with high accuracy.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a hydraulic control device according to the present invention will hereinafter be described in detail with reference to the attached drawings.

[1. Structure of the Present Embodiment]

Figure 1:
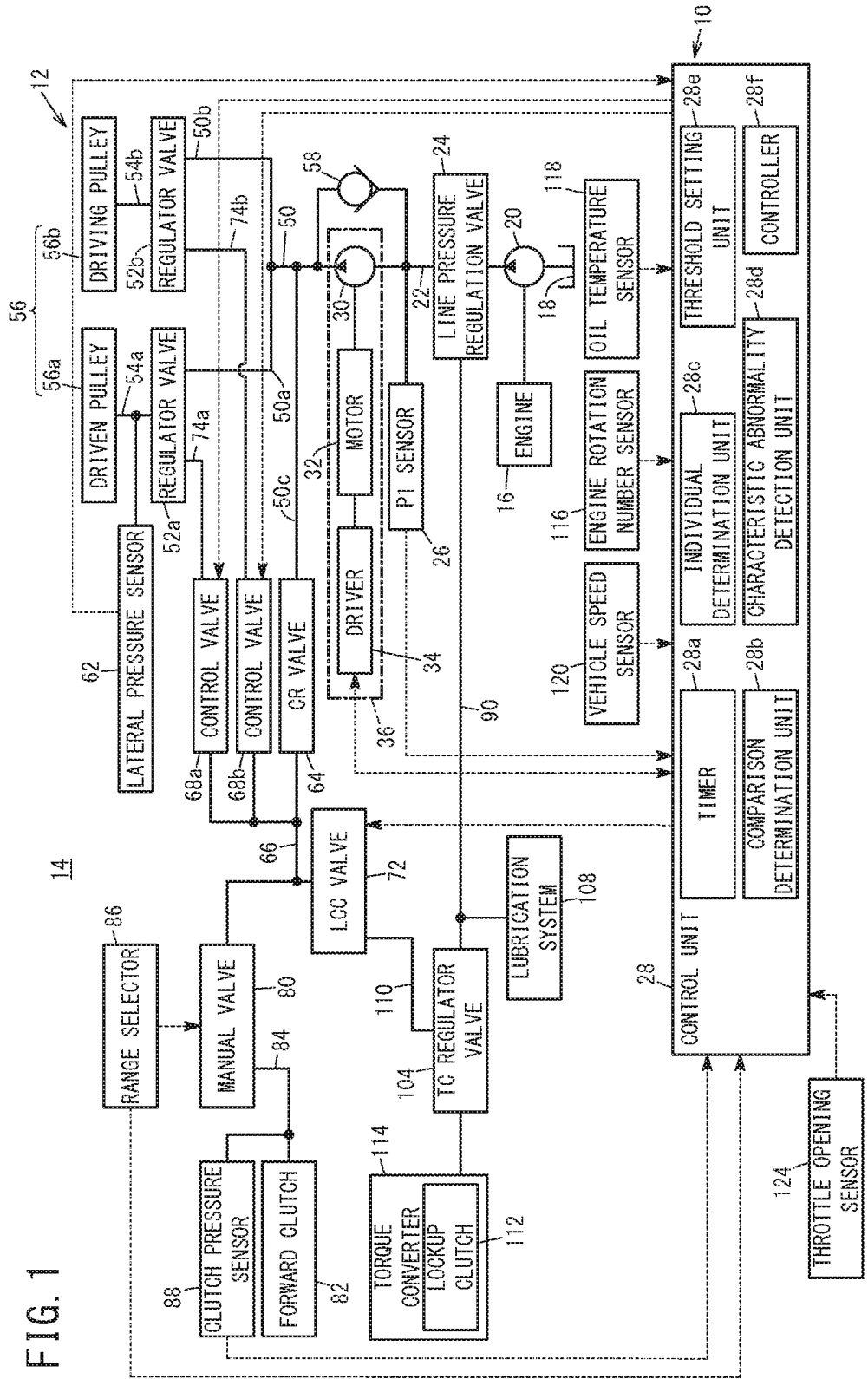
FIG. 1 is a structure diagram of a hydraulic control device according to the present embodiment.

FIG. 1 is a structure diagram of a hydraulic control device 10 according to the present embodiment. The hydraulic control device 10 is used in, for example, a vehicle 14 including a transmission 12 corresponding to a continuously variable transmission (CVT).

The hydraulic control device 10 includes a first pump (mechanical pump) 20 that is driven by an engine 16 of the vehicle 14 and pumps up oil (hydraulic oil) stored in a reservoir 18 and transfers the oil with pressure. An output side of the first pump 20 is connected to an oil passage 22. The oil that is transferred with pressure from the first pump 20 flows as first oil in the oil passage 22. In the middle of the oil passage 22, a line pressure regulation valve 24 corresponding to a spool valve is provided.

In the oil passage 22, an output pressure sensor (P1 sensor, first hydraulic sensor) 26 is disposed downstream of the line pressure regulation valve 24. The output pressure sensor 26 is a hydraulic sensor that sequentially detects a pressure P1 of the first oil (output pressure of the first pump 20) flowing in the oil passage 22, and sequentially outputs a detection signal expressing the detected output pressure P1 to a control unit 28 to be described below. On the downstream side in the oil passage 22, a second pump 30 that is smaller in capacity than the first pump 20 is connected.

The second pump 30 is an electric pump that is driven by a rotation of a motor 32 included in the vehicle 14, and that outputs as second oil, the first oil that is supplied through the oil passage 22. In this case, the second pump 30 can pressurize the first oil that is supplied, and transfer the first oil that has been pressurized as the second oil. The motor 32 rotates under a control of a driver 34. The driver 34 controls the driving of the motor 32 on the basis of a control signal supplied from the control unit 28, and moreover, sequentially outputs a signal expressing a driving state of the motor 32 (for example, a rotation number (rotation speed) Nem of the motor 32 in accordance with a rotation number (rotation speed) Nep of the second pump 30) to the control unit 28. The second pump 30, the motor 32, and the driver 34 form an electric pump unit 36.

An output side of the second pump 30 is connected to an oil passage 50. The oil passage 50 is branched into two oil passages 50a, 50b on the downstream side. The one oil passage 50a is connected through a regulator valve 52a and an oil passage 54a to a driven pulley 56a included in a continuously variable transmission mechanism 56 of the transmission 12. The other oil passage 50b is connected through a regulator valve 52b and an oil passage 54b to a driving pulley 56b included in the continuously variable transmission mechanism 56.

Between the two oil passages 22, 50, a check valve 58 and the second pump 30 are connected in parallel. The check valve 58 is a non-return valve provided to bypass the second pump 30, and allows the oil (first oil) to flow from the oil passage 22 on the upstream side to the direction of the oil passage 50 on the downstream side and prevents the oil (second oil) from flowing from the oil passage 50 on the downstream side to the direction of the oil passage 22 on the upstream side.

In the oil passage 54a, a lateral pressure sensor (second hydraulic sensor) 62 is disposed as a hydraulic sensor that detects a pressure PDN of the oil to be supplied to the driven pulley 56a (pulley pressure corresponding to the lateral pressure of the driven pulley 56a).

A CR valve 64 is connected to the downstream side of an oil passage 50c that is branched from the oil passage 50. The upstream side of the CR valve 64 is connected to the oil passage 50c, and the downstream side of the CR valve 64 is connected to two control valves 68a, 68b and an LCC valve 72 through an oil passage 66. The CR valve 64 is a reducing valve. The CR valve 64 reduces the pressure of the oil (second oil) supplied from the oil passage 50c, and supplies the oil with the reduced pressure to the control valves 68a, 68b and the LCC valve 72 through the oil passage 66.

Each of the control valves 68a, 68b is a normally open electromagnetic valve with a solenoid. The control valves 68a, 68b are closed while the control signal (current signal) is supplied from the control unit 28 and current flows in the solenoid and on the other hand, the control valves 68a, 68b are open while current does not flow in the solenoid.

In this case, the one control valve 68a is a solenoid valve for the driven pulley 56a, and when the valve is opened, the oil supplied from the CR valve 64 through the oil passage 66 is supplied to the regulator valve 52a through an oil passage 74a.

The other control valve 68*b* is a solenoid valve for the driving pulley 56*b*, and when the valve is opened, the oil supplied from the CR valve 64 through the oil passage 66 is supplied to the regulator valve 52*b* through an oil passage 74*b*.

Therefore, the one regulator valve 52*a* uses the pressure of the oil supplied from the control valve 68*a* through the oil passage 74*a*, as a pilot pressure. If the pressure (hereinafter also referred to as line pressure PH) of the oil supplied through the oil passages 50, 50*a* is more than or equal to a predetermined pressure, the regulator valve 52*a* is opened to supply the oil to the driven pulley 56*a* through the oil passage 54*a*. In addition, the other regulator valve 52*b* uses the pressure of the oil supplied from the control valve 68*b* through the oil passage 74*b*, as the pilot pressure. If the pressure (line pressure PH) of the oil supplied through the oil passages 50, 50*b* is more than or equal to the predetermined pressure, the regulator valve 52*b* is opened to supply the oil to the driving pulley 56*b* through the oil passage 54*b*.

The control valve 68*a* can regulate the pressure of the oil output to the oil passage 74*a*. In addition, the control valve 68*b* can regulate the pressure of the oil output to the oil passage 74*b*.

To the downstream side of the oil passage 66, a manual valve 80 is connected. To the manual valve 80, for example, a forward clutch 82 is connected. That is to say, the upstream side of the manual valve 80 is connected to the oil passage 66, and the downstream side thereof is connected to the forward clutch 82 through an oil passage 84. The manual valve 80 is a spool valve. When a driver operates a range selector 86 provided near a driver's seat in the vehicle 14 to select any one of shift ranges such as P (parking), R (reverse), N (neutral), and D (forward, drive), the spool that is not shown is moved by a predetermined amount in an axial direction in accordance with the selected shift range. Thus, the manual valve 80 supplies the oil that is supplied through the oil passage 66, to the forward clutch 82 through the oil passage 84, so that the vehicle 14 can travel in a forward direction. In the middle of the oil passage 84, a clutch pressure sensor 88 is provided. The clutch pressure sensor 88 detects the pressure of the oil supplied to the oil passage 84 (clutch pressure).

To an oil passage 90 branched from the oil passage 22 through the line pressure regulation valve 24, a hydraulic operation unit with a low pressure is connected. To the hydraulic operation unit, the first oil is supplied through the oil passage 90. The line pressure regulation valve 24 is a spool valve. The line pressure regulation valve 24 regularly connects between the first pump 20, and the second pump 30 and the check valve 58 through the oil passage 22, and by a displacement of the spool that is not shown, connects between the oil passage 22 and the oil passage 90 so that the first oil flows to the oil passage 90.

A TC regulator valve 104 and a lubrication system 108 for the transmission 12 are connected to the downstream side of the oil passage 90. The TC regulator valve 104 is connected to the LCC valve 72 through an oil passage 110, and the downstream side of the TC regulator valve 104 is connected to a torque converter 114 incorporating a lockup clutch 112.

The LCC valve 72 is a solenoid valve for the lockup clutch 112. While the control signal is supplied from the control unit 28 to make current flow in the solenoid, the LCC valve 72 is open to connect the oil passages 66, 110 to each other, and thus the oil is supplied to the TC regulator valve 104. The TC regulator valve 104 is a spool valve. When the spool that is not shown is operated in the axial direction in accordance with the pressure of the oil supplied from the LCC valve 72 through the oil passage 110, the pressure of the first oil supplied through the oil passage 90 is reduced and the first oil with the reduced pressure is supplied to the torque converter 114 and the lockup clutch 112.

The lubrication system 108 lubricates various components such as a bearing and a gear in the transmission 12.

The hydraulic control device 10 further includes an engine rotation number sensor 116, an oil temperature sensor 118, a vehicle speed sensor 120, a throttle opening sensor 124, and the control unit 28. The engine rotation number sensor 116 sequentially detects the engine rotation number New of the engine 16 in accordance with the rotation number Nmp of the first pump 20, and sequentially outputs the detection signal expressing the detected engine rotation number New (rotation number Nmp) to the control unit 28. The oil temperature sensor 118 sequentially detects a temperature (oil temperature) To of the first oil or the second oil, and sequentially outputs the detection signal expressing the detected oil temperature To to the control unit 28. The vehicle speed sensor 120 sequentially detects a vehicle speed V of the vehicle 14, and sequentially outputs the detection signal expressing the detected vehicle speed V to the control unit 28. In a case where the opening of the throttle valve (throttle opening) TH changes as a driver operates an accelerator pedal that is not shown, the throttle opening sensor 124 sequentially detects the throttle opening TH and sequentially outputs the detection signal expressing the detected throttle opening TH to the control unit 28.

The control unit 28 is a microcomputer such as a CPU functioning as a transmission control unit (TCU) that controls the transmission 12 or an engine control unit (ECU) that controls the engine 16. The control unit 28 achieves functions of a timer 28*a*, a comparison determination unit 28*b*, an individual determination unit 28*c*, a characteristic abnormality detection unit 28*d*, a threshold setting unit 28*e*, and a controller 28*f* by reading and executing programs stored in a storage unit that is not shown.

The timer 28*a* measures a certain time from a predetermined time point. The comparison determination unit 28*b* determines whether a characteristic abnormality occurs in at least one of the output pressure sensor 26 and the lateral pressure sensor 62 by comparing the output pressure P1 detected by the output pressure sensor 26 and the lateral pressure PDN detected by the lateral pressure sensor 62. The individual determination unit 28*c* determines whether a characteristic abnormality occurs in a hydraulic sensor as a determination target (the output pressure sensor 26, the lateral pressure sensor 62) by individually determining whether the output pressure P1 or the lateral pressure PDN is deviated from a predetermined range (range between an upper limit threshold PDNα and a lower limit threshold PDNβ).

The characteristic abnormality detection unit 28*d* determines the hydraulic sensor in which the characteristic abnormality occurs, by using the determination results in the comparison determination unit 28*b* and the individual determination unit 28*c*. The threshold setting unit 28*e* sets the upper limit threshold PDNα and the lower limit threshold PDNβ that are used in the determination process in the individual determination unit 28*c*. On the basis of the output pressure P1 detected by the output pressure sensor 26, the controller 28*f* generates the control signal for controlling the motor 32 that drives the second pump 30 and outputs the control signal to the driver 34.

Note that since the transmission 12 corresponding to the continuously variable transmission is well known, the detailed description thereof is omitted.

[2. Operation of the Present Embodiment]

An operation of the hydraulic control device 10 according to the present embodiment with the above structure will be described with reference to FIG. 2 to FIG. 8. Here, the description is made of a process in which the control unit 28 determines the characteristic abnormality of the output pressure sensor 26 and the lateral pressure sensor 62.

<2.1 Basic Operation of Hydraulic Control Device 10>

Before the above determination process is described, a basic operation of the hydraulic control device 10 is described. The basic operation to be described mainly here is the operation of a hydraulic system that supplies the oil to the continuously variable transmission mechanism 56 from the reservoir 18 through the first pump 20, for example.

First, when the driving of the first pump 20 is started by the driving of the engine 16, the first pump 20 pumps up the oil from the reservoir 18 and starts to transfer the pumped oil as the first oil with pressure. Thus, the first oil flows in the oil passage 22 through the line pressure regulation valve 24. The output pressure sensor 26 sequentially detects the pressure (output pressure) P1 of the first oil flowing in the oil passage 22, and outputs the signal expressing the detection result to the control unit 28. The engine rotation number sensor 116 sequentially detects the engine rotation number New, and sequentially outputs the signal expressing the detection result to the control unit 28.

In this case, the motor 32 is not driven; therefore, the first oil flowing in the oil passage 22 flows to the oil passage 50 through the check valve 58, and is supplied to the CR valve 64 through the oil passages 50, 50c. The CR valve 64 reduces the pressure of the first oil that is supplied, and supplies the first oil with the reduced pressure to the control valves 68a, 68b through the oil passage 66.

Here, the control signal (current value IDN, IDR) is supplied in advance from the control unit 28 to the solenoid in each of the control valves 68a, 68b, so that the control valves 68a, 68b are in a closed state. Then, if the supply of the control signal to each solenoid is stopped, the control valves 68a, 68b are switched from the closed state to an open state. Thus, the control valve 68a supplies the oil to the regulator valves 52a through the oil passage 74a. In addition, the control valve 68b supplies the oil to the regulator valves 52b through the oil passage 74b.

The regulator valve 52a uses the pressure of the oil supplied through the oil passage 74a, as the pilot pressure, and if the pressure of the first oil (line pressure PH) is more than or equal to the predetermined pressure, the regulator valve 52a is opened to supply the first oil to the driven pulley 56a through the oil passage 54a. The lateral pressure sensor 62 sequentially detects the pressure of the first oil supplied to the driven pulley 56a (pulley pressure PDN as the lateral pressure), and sequentially outputs the signal expressing the detection result to the control unit 28.

On the other hand, the regulator valve 52b uses the pressure of the oil supplied through the oil passage 74b, as the pilot pressure, and if the pressure of the first oil (line pressure PH) is more than or equal to the predetermined pressure, the regulator valve 52b is opened to supply the first oil to the driving pulley 56b through the oil passage 54b.

Note that in the line pressure regulation valve 24, the first oil that flows in the oil passage 50 is fed back to the line pressure regulation valve 24 through the oil passage that is not shown and the spool is displaced depending on the line pressure PH, so that the oil passage 22 and the oil passage 90 are connected to supply the first oil to the low-pressure system such as the lubrication system 108.

In this manner, when the control signal is supplied from the control unit 28 (controller 28f thereof) to the driver 34 in a state that the first pump 20 is driven, the driver 34 drives the motor 32 on the basis of the control signal to drive the second pump 30. Thus, the second pump 30 outputs as the second oil, the first oil that flows in the oil passage 22. The second oil flows in the oil passage 50 and is supplied to the CR valve 64 through the oil passage 50c.

Then, when the second oil flows in the oil passage 50 and the flow rate of the second oil (discharging flow rate of the second pump 30) exceeds the flow rate of the first oil (discharging flow rate of first pump 20), the pressure of the oil (line pressure PH) on the oil passage 50 side becomes higher than the pressure of the oil (output pressure P1) on the oil passage 22 side in the check valve 58. Thus, the check valve 58 is closed, so that the supply of the first oil from the first pump 20 to the continuously variable transmission mechanism 56 or the like through the check valve 58 and the oil passage 50 is switched to the supply of the second oil from the second pump 30 to the continuously variable transmission mechanism 56 or the like through the oil passage 50. As a result, the flow of the first oil to the oil passage 50 is stopped and the second pump 30 transfers the second oil with pressure to the continuously variable transmission mechanism 56 or the like. Note that the driver 34 sequentially outputs the signal expressing the motor rotation number Nem of the motor 32 (the rotation number Nep of the second pump 30) to the control unit 28.

The CR valve 64 reduces the pressure of the second oil that is supplied, and supplies the second oil with the reduced pressure to the control valves 68a, 68b through the oil passage 66. Since the control valve 68a is open, the oil is supplied to the regulator valve 52a through the oil passage 74a. In addition, since the control valve 68b is open, the oil is supplied to the regulator valve 52b through the oil passage 74b.

As a result, the regulator valve 52a uses the pressure of the oil supplied through the oil passage 74a, as the pilot pressure and supplies the second oil to the driven pulley 56a. The lateral pressure sensor 62 sequentially detects the pressure of the second oil supplied to the driven pulley 56a (lateral pressure PDN), and outputs the detected pressure to the control unit 28. On the other hand, the regulator valve 52b uses the pressure of the oil supplied through the oil passage 74b, as the pilot pressure and supplies the second oil to the driving pulley 56b.

Thus, since the second oil that has been pressurized (PH>P1) is supplied to the driven pulley 56a and the driving pulley 56b, the pressure (output pressure) P1 of the first oil can be reduced and accordingly, the load on the first pump 20 can be reduced.

<2.2 Process of Determining Characteristic Abnormality of Hydraulic Sensor>

Figure 3:
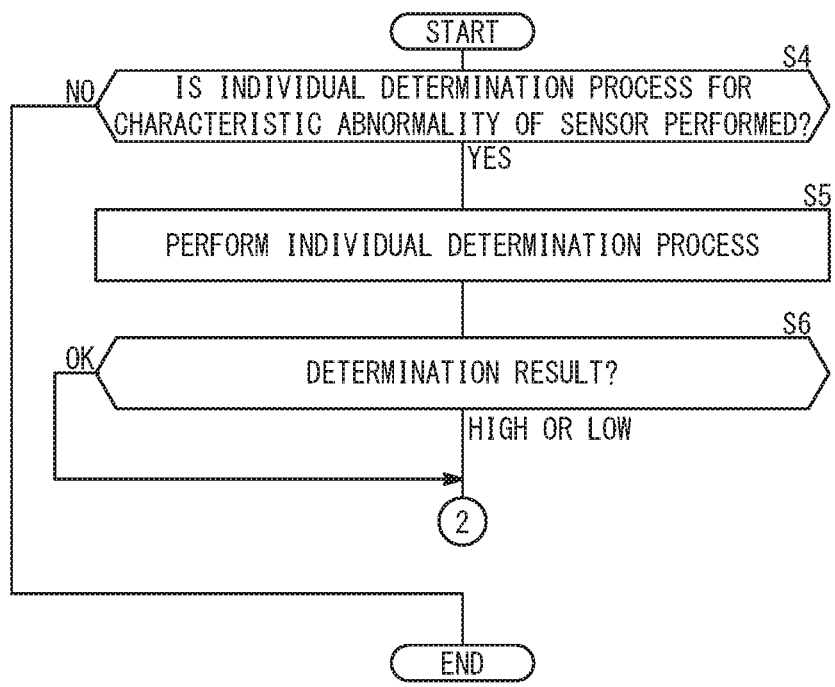
FIG. 3 is a flowchart expressing an operation (determination process of individual determination unit) of the hydraulic control device in FIG. 1.
Figure 4:
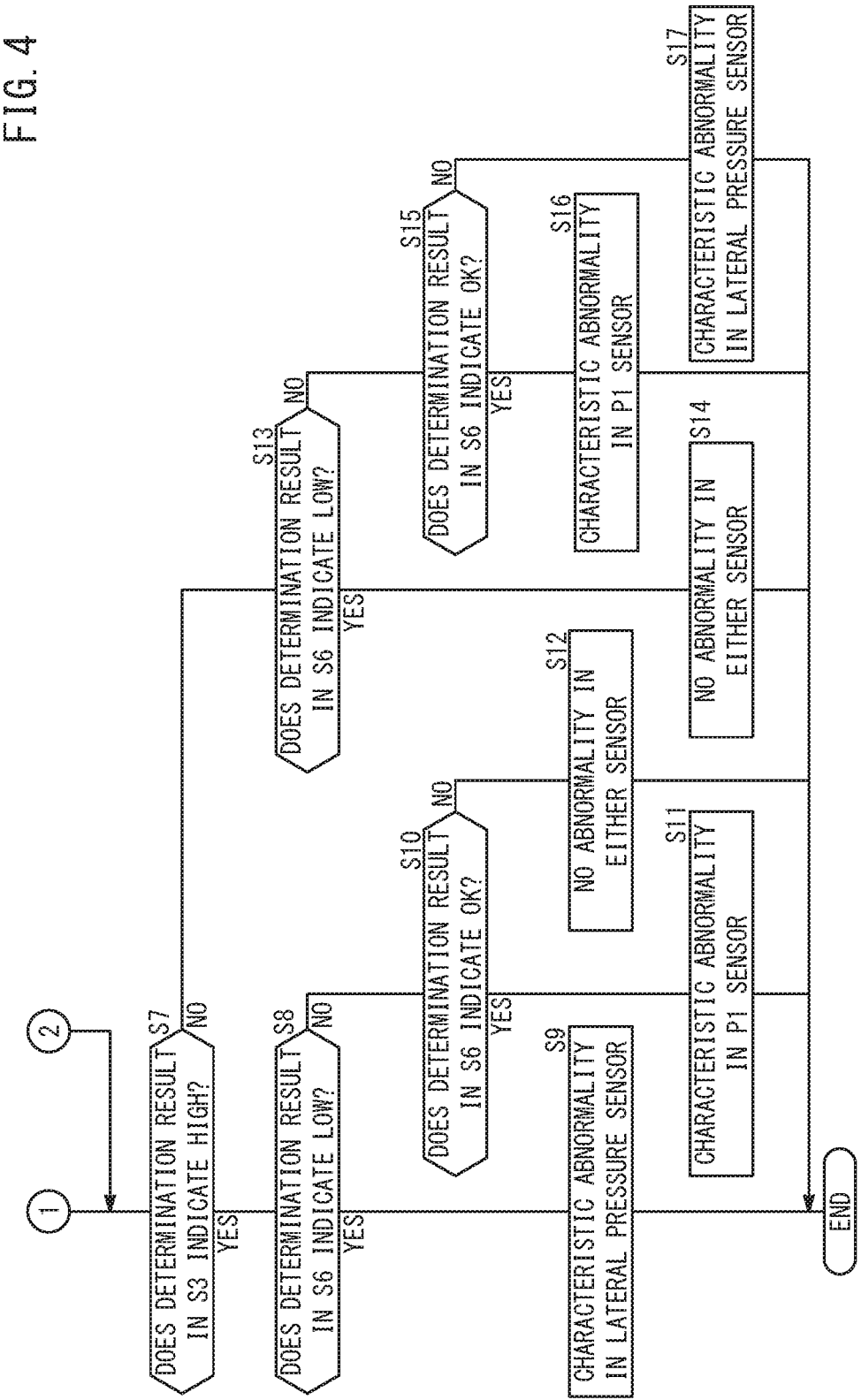
FIG. 4 is a flowchart expressing an operation (detection process of characteristic abnormality detection unit) of the hydraulic control device in FIG. 1.
Figure 5:
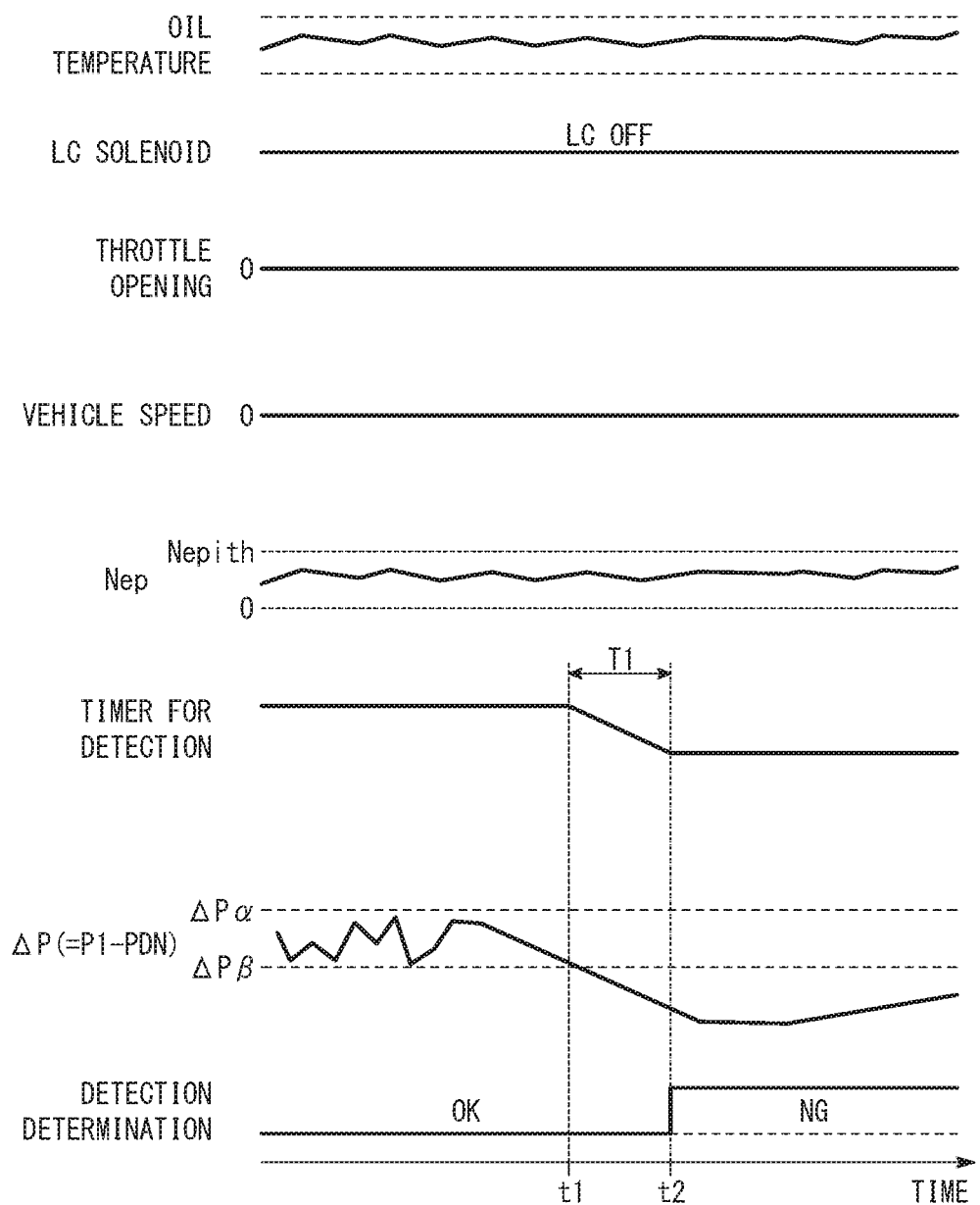
FIG. 5 is a timing chart expressing timings at which the determination process of the comparison determination unit in FIG. 2 is performed.
Figure 6:
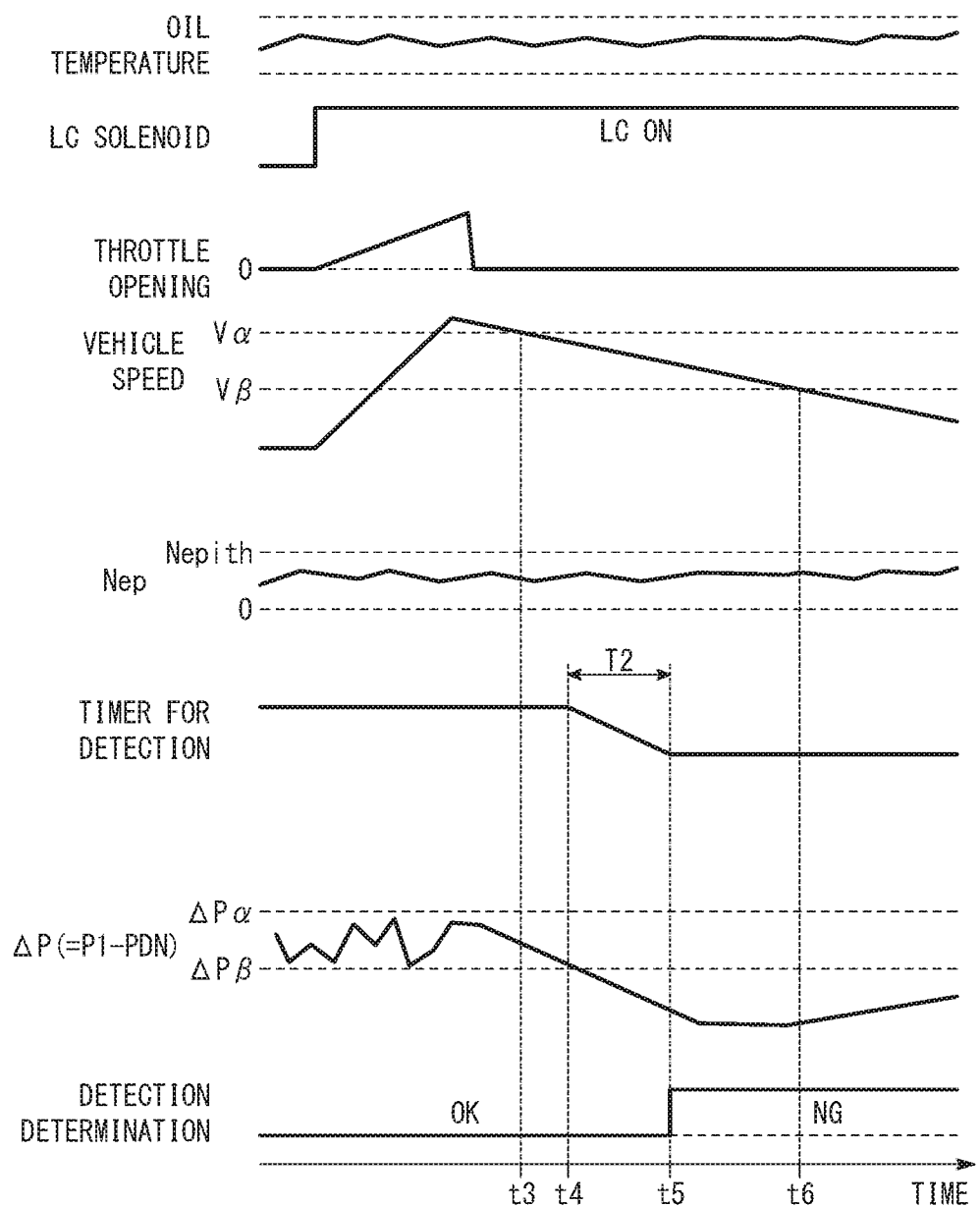
FIG. 6 is a timing chart expressing timings at which the determination process of the comparison determination unit in FIG. 2 is performed.
Figure 7:
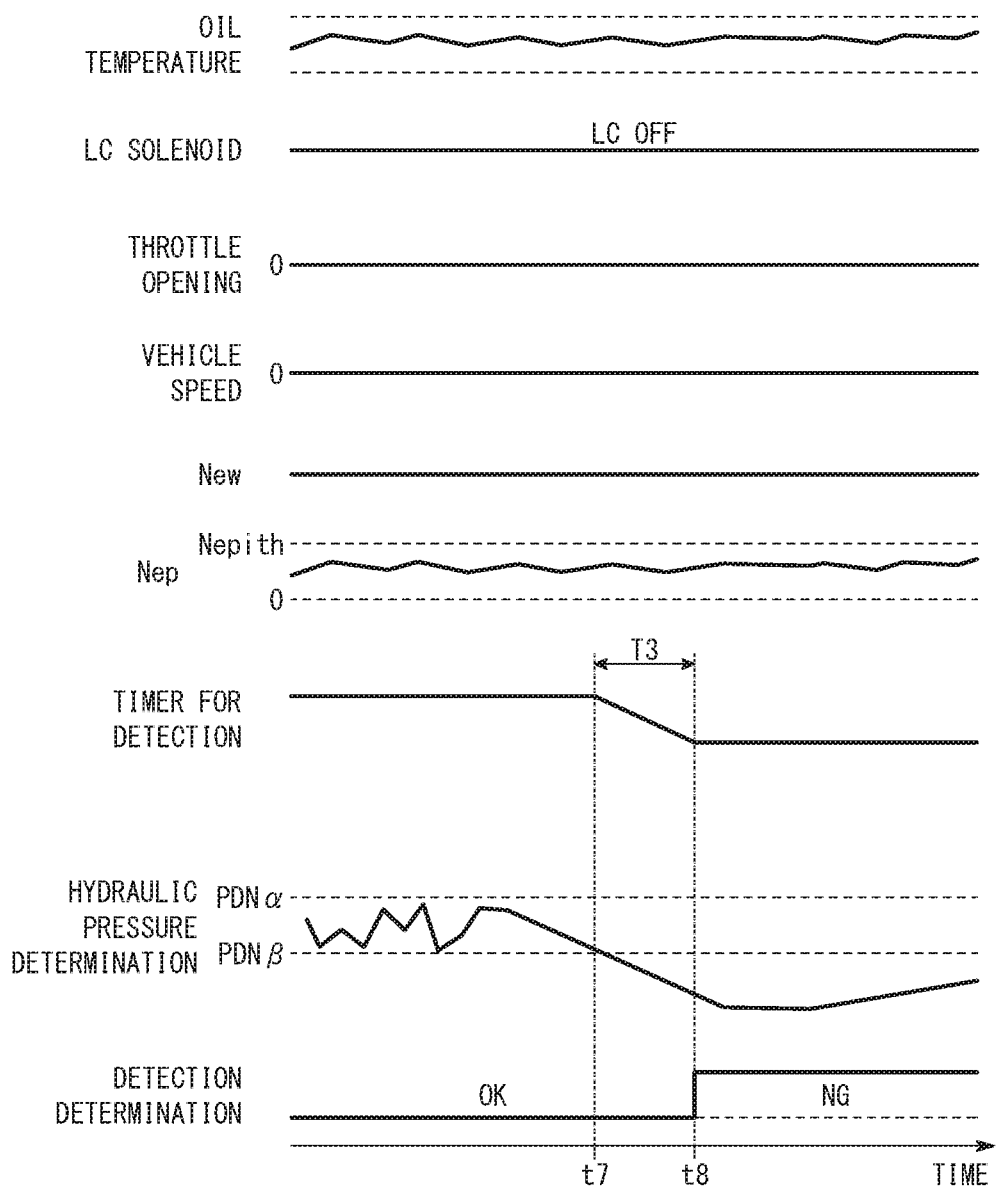
FIG. 7 is a timing chart expressing timings at which the determination process of the individual determination unit in FIG. 3 is performed.

Next, with reference to FIG. 2 to FIG. 8, description is made of a characteristic operation of the hydraulic control device 10 according to the present embodiment, that is, the process in which the control unit 28 determines the characteristic abnormality of the output pressure sensor 26 and the lateral pressure sensor 62. Note that as illustrated in FIG. 5 to FIG. 7, this determination process is performed mainly when the second pump 30 is rotated at an idling rotation number (in FIG. 5 to FIG. 7, in the range of 0≤Nep≤Nepith (upper limit of the idling rotation number)), or when the second pump 30 is in a stop state.

As described above, the detection signals are sequentially input from the sensors in the vehicle 14 to the control unit 28. FIG. 5 and FIG. 6 show how the oil temperature To, the throttle opening TH, the vehicle speed V, and the rotation number Nep of the second pump 30 change over time. FIG. 5 and FIG. 6 also show whether current flows from the control unit 28 to the solenoid of the LCC valve 72.

(2.2.1 Determination Process of Comparison Determination Unit 28b (Comparison Determination Process))

Figure 2:
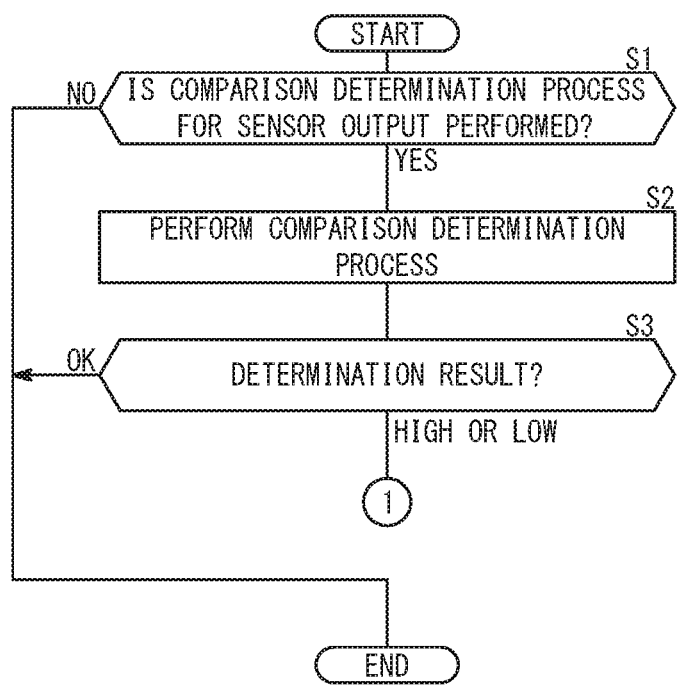
FIG. 2 is a flowchart expressing an operation (determination process of comparison determination unit) of the hydraulic control device in FIG. 1.

In step S1 in FIG. 2, the comparison determination unit 28b determines whether to perform the comparison determination process for the output pressure P1 detected by the output pressure sensor 26 and the lateral pressure PDN detected by the lateral pressure sensor 62. Specifically, the comparison determination unit 28b determines whether the rotation number Nep of the second pump 30 is in the range of the idling rotation number shown in FIG. 5 and FIG. 6 (0≤Nep≤Nepith) or the second pump 30 is in the stop state (Nep=0).

That is to say, the output pressure sensor 26 is disposed upstream of the lateral pressure sensor 62 in the hydraulic circuit from the first pump 20 to the continuously variable transmission mechanism 56. Therefore, if the output pressure sensor 26 and the lateral pressure sensor 62 operate normally and have approximately the same performance, the output pressure P1 becomes a hydraulic value that is large by the pressure loss in the hydraulic circuit as compared to the lateral pressure PDN. Therefore, by performing the comparison determination process in the comparison determination unit 28b when the second pump 30 is idling or the second pump 30 is in the stop state, the accuracy of the determination process can be increased. In addition, the output pressure P1 and the lateral pressure PDN change stably (a fixed value is maintained) even though the time elapses; therefore, it is easy to detect the output pressure P1 and the lateral pressure PDN.

Here, the comparison determination process in the example of FIG. 5 is described.

As shown in FIG. 5, in a case where the vehicle 14 is in the stop state, the oil temperature To is maintained in a predetermined temperature range, and current does not flow to the solenoid in the LCC valve 72 (LC: OFF). In this case, moreover, the throttle opening TH and the vehicle speed V are maintained to be zero and the second pump 30 rotates at the idling rotation number. In this case, the comparison determination unit 28b determines that it is possible to perform the comparison determination process for the output pressure P1 and the lateral pressure PDN (step S1: YES) and the process advances to the next step S2. Note that, in a case where the determination result is negative in step S1 (step S1: NO), the process of and after step S2 is not performed.

First, at the time of a reception of a positive determination result in step S1, the timer 28a starts to measure a predetermined time T1 from a time point t1 to a time point t2 in step S2. Next, the comparison determination unit 28b calculates a hydraulic pressure difference ΔP by subtracting the lateral pressure PDN detected by the lateral pressure sensor 62 from the output pressure P1 detected by the output pressure sensor 26 (ΔP=P1−PDN). As described above, the output pressure sensor 26 sequentially detects the output pressure P1, and on the other hand the lateral pressure sensor 62 sequentially detects the lateral pressure PDN; therefore, the comparison determination unit 28b sequentially calculates the hydraulic pressure difference ΔP. Alternatively, the comparison determination unit 28b may calculate the hydraulic pressure difference ΔP by using only the output pressure P1 and the lateral pressure PDN at the time point t2. Note that FIG. 5 also shows how the hydraulic pressure difference ΔP changes over time.

Next, in step S3, the comparison determination unit 28b determines whether the characteristic abnormality occurs in the output pressure sensor 26 and the lateral pressure sensor 62 on the basis of the hydraulic pressure difference ΔP. In this case, the comparison determination unit 28b determines whether at least the hydraulic pressure difference ΔP at the time point t2 is within the predetermined range (between upper limit threshold ΔPα and lower limit threshold ΔPβ), so as to determine whether the characteristic abnormality occurs in the output pressure sensor 26 and the lateral pressure sensor 62.

In this case, if the hydraulic pressure difference ΔP is between the upper limit threshold ΔPα and the lower limit threshold ΔPβ (ΔPβ≤ΔP≤ΔPα), the comparison determination unit 28b determines that the characteristic abnormality does not occur in the output pressure sensor 26 and the lateral pressure sensor 62 (step S3: OK), and terminates the process of determining the characteristic abnormality in the control unit 28.

On the other hand, if the hydraulic pressure difference ΔP is more than the upper limit threshold ΔPα (ΔP>ΔPα, step S3: high) or less than the lower limit threshold ΔPβ (ΔPβ>ΔP, step S3: low), the comparison determination unit 28b determines that the characteristic abnormality occurs in at least one hydraulic sensor of the output pressure sensor 26 and the lateral pressure sensor 62 and sets a flag (determination: NG) expressing that the characteristic abnormality occurs.

Next, description is given concerning the comparison determination process in the example of FIG. 6.

In the example of FIG. 6, the comparison determination process is performed while the speed of the vehicle 14 is decreased. In this case, even if current flows from the control unit 28 to the solenoid of the LCC valve 72 (LC: ON), the oil temperature To is maintained in the predetermined temperature range and the throttle opening TH is maintained to be zero, so that the vehicle speed V is decreased; moreover, the second pump 30 rotates at the idling rotation number.

If the vehicle speed V decreases to a predetermined range (in FIG. 6, in the range between upper limit threshold Vα at time point t3 and lower limit threshold Vβ at time point t6) at a time point t3 and then the vehicle speed V decreases as the time elapses, the comparison determination unit 28b determines that the speed of the vehicle 14 decreases. Then, while the second pump 30 rotates at the idling rotation number, the comparison determination unit 28b determines that the comparison determination process can be performed for the output pressure P1 and the lateral pressure PDN (step S1: YES).

Receiving the positive determination result in step S1, the timer 28a starts to measure a predetermined time T2 (=T1) from a time point t4 to a time point t5 in step S2. Next, the comparison determination unit 28b sequentially calculates the hydraulic pressure difference ΔP or calculates only the hydraulic pressure difference ΔP at the time point t5.

In step S3, the comparison determination unit 28b determines at least whether the hydraulic pressure difference ΔP at the time point t5 is in the range of the upper limit threshold ΔPα to the lower limit threshold ΔPβ in a manner similar to the example in FIG. 5, so as to determine whether the characteristic abnormality occurs in the output pressure sensor 26 and the lateral pressure sensor 62.

Note that in the comparison determination process in FIG. 2, FIG. 5, and FIG. 6, the determination process is performed by calculating the hydraulic pressure difference ΔP between the output pressure P1 detected by the output pressure sensor 26 and the lateral pressure PDN detected by the lateral pressure sensor 62. Therefore, it should be noted that it is possible to detect whether the characteristic abnormality occurs in either one of or both the hydraulic sensors but impossible to detect which hydraulic sensor has the characteristic abnormality. That is to say, if $\Delta P > \Delta P\alpha$ in step S3 (step S3: high), the detection value of the output pressure sensor 26 may be deviated to be higher than the actual output pressure P1 or the detection value of the lateral pressure sensor 62 may be deviated to be lower than the actual lateral pressure PDN. In addition, if $\Delta P\beta > \Delta P$ in step S3 (step S3: low), the detection value of the output pressure sensor 26 may be deviated to be lower than the actual output pressure P1 or the detection value of the lateral pressure sensor 62 may be deviated to be higher than the actual lateral pressure PDN.

(2.2.2 Determination Process of Individual Determination Unit 28c (Individual Determination Process))

In step S4 in FIG. 3, the individual determination unit 28c determines whether to individually perform the determination process for the characteristic abnormality of the output pressure sensor 26 and the lateral pressure sensor 62. Specifically, in a manner similar to step S1 in FIG. 2, the individual determination unit 28c determines whether the rotation number Nep of the second pump 30 is in the range of the idling rotation number of Nep=0 to Nepith shown in FIG. 7 or the second pump 30 is in the stop state.

For example, as shown in FIG. 7, the vehicle 14 is in the stop state, the oil temperature To is in the predetermined temperature range, current does not flow in the solenoid of the LCC valve 72 (LC: OFF), the throttle opening TH and the vehicle speed V are maintained to be zero, and the second pump 30 rotates at the idling rotation number. In this case, the individual determination unit 28c determines that the individual determination process for the output pressure P1 and the lateral pressure PDN can be performed (S4: YES), and the process advances to the next step S5. If the determination result in step S4 is negative (step S4: NO), the process of and after step S5 is not performed.

Receiving the positive determination result in step S4, the timer 28a starts to measure the predetermined time T3 (=T1=T2) from a time point t7 to a time point t8 in step S5. Next, the individual determination unit 28c determines whether at least the lateral pressure PDN detected by the lateral pressure sensor 62 at the time point t8 is in the predetermined range (in the range between upper limit threshold PDN$\alpha$ and lower limit threshold PDN$\beta$), so as to individually determine whether the characteristic abnormality occurs in the lateral pressure sensor 62.

In this case, if the lateral pressure PDN is between the upper limit threshold PDN$\alpha$ and the lower limit threshold PDN$\beta$ (PDN$\beta \leq$ PDN $\leq$ PDN$\alpha$), the individual determination unit 28c determines that the characteristic abnormality does not occur in the lateral pressure sensor 62 (step S6: OK). On the other hand, if the lateral pressure PDN is more than the upper limit threshold PDN$\alpha$ (PDN>PDN$\alpha$, step S6: high) or the lateral pressure PDN is less than the lower limit threshold PDN$\beta$ (PDN$\beta$>PDN, step S6: low), the individual determination unit 28c determines that the characteristic abnormality occurs in the lateral pressure sensor 62 and sets the flag (determination: NG) expressing that the characteristic abnormality occurs. That is to say, if PDN>PDN$\alpha$ in step S6 (step S6: high), the detection value of the lateral pressure sensor 62 may be deviated to be higher than the actual lateral pressure PDN. In addition, if PDN<PDN$\beta$ in step S6 (step S6: low), the detection value of the lateral pressure sensor 62 may be deviated to be lower than the actual lateral pressure PDN.

Note that although FIG. 3 and FIG. 7 show the determination process for the lateral pressure PDN, the determination process can individually be performed regarding the output pressure P1 in a similar procedure.

In addition, as described above, since the detection signals are sequentially input from the sensors to the control unit 28, the comparison determination process in FIG. 2 by the comparison determination unit 28b and the individual determination process in FIG. 3 by the individual determination unit 28c can be performed in parallel at the same time. Needless to say, it is possible to perform the individual determination process in FIG. 3 after the comparison determination process in FIG. 2 is performed, or to perform the comparison determination process in FIG. 2 after the individual determination process in FIG. 3 is performed.

Figure 8:
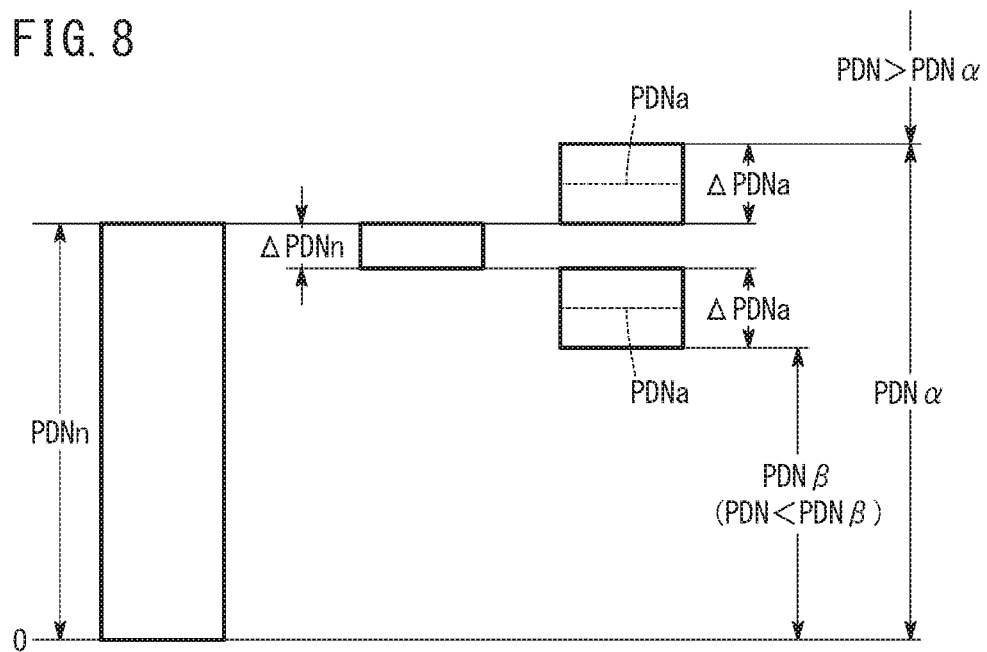
FIG. 8 is an explanatory diagram illustrating a procedure of setting a threshold range in FIG. 7.

FIG. 8 is an explanatory diagram illustrating a procedure of setting the upper limit threshold PDN$\alpha$ and the lower limit threshold PDN$\beta$ by the threshold setting unit 28e in the example of FIG. 7.

The threshold setting unit 28e first estimates a nominal value (average value) PDNn of the lateral pressure PDN from the current value of the control signal that is supplied to the solenoid of the control valve 68a. The lateral pressure PDN changes depending on the oil temperature To or the like; therefore, the threshold setting unit 28e sets the margin $\Delta$PDNn based on the variation of the current value and the lateral pressure PDN.

Next, the threshold setting unit 28e sets the upper limit threshold PDN$\alpha$ and the lower limit threshold PDN$\beta$ in consideration of the detection variation of the lateral pressure sensor 62. In this case, assuming that the detection value of the lateral pressure PDN is PDNa and the detection error range for this detection value is $\Delta$PDNa, the threshold setting unit 28e sets as the upper limit threshold PDN$\alpha$, the value obtained by adding the detection error range $\Delta$PDNa to the nominal value PDNn (PDN$\alpha$=PDNn+$\Delta$PDNa). In addition, the threshold setting unit 28e sets as the lower limit threshold PDN$\beta$ the value obtained by subtracting the margin $\Delta$PDNn and the detection error range $\Delta$PDNa from the nominal value PDNn (PDN$\beta$=PDNn−$\Delta$PDNn−$\Delta$PDNa).

The threshold setting unit 28e outputs the upper limit threshold PDN$\alpha$ and the lower limit threshold PDN$\beta$ that are set in this manner to the individual determination unit 28c, and the individual determination unit 28c performs the individual determination process using the upper limit threshold PDN$\alpha$ and the lower limit threshold PDN$\beta$ that are input. Note that the threshold setting unit 28e may set various thresholds used in the determination process of the comparison determination unit 28b and the individual determination unit 28c, in addition to setting the upper limit threshold PDN$\alpha$ and the lower limit threshold PDN$\beta$.

(2.2.3 Detection Process of Characteristic Abnormality Detection Unit 28d)

Receiving the result in each determination process in FIG. 2 and FIG. 3, the characteristic abnormality detection unit 28d performs the detection process for determining the hydraulic sensor in which the characteristic abnormality occurs in accordance with a flowchart in FIG. 4.

First, the characteristic abnormality detection unit 28d receives the determination result expressing that the characteristic abnormality occurs in step S3 in FIG. 2 (the determination result expressing "high" or "low") and the determination result in step S6 in FIG. 3 (the determination result expressing "OK", "high", or "low") from the comparison determination unit 28b and the individual determination unit 28c, respectively.

Next, the characteristic abnormality detection unit 28*d* determines whether the determination result in step S3 indicates "high", that is ΔP>ΔPα in step S7 in FIG. 4. If the determination result in step S7 is positive (step S7: YES), the process advances to the next step S8.

In step S8, the characteristic abnormality detection unit 28*d* determines whether the determination result in steps S6 indicates "low", that is PDNβ>PDN. If the determination result in step S8 is positive (step S8: YES), the process advances to the next step S9.

In step S9, from the determination result in step S7, the characteristic abnormality detection unit 28*d* determines that the hydraulic pressure difference ΔP becomes larger because one of the output pressure sensor 26 and the lateral pressure sensor 62 has the characteristic abnormality, that is, the detected output pressure P1 is too high or the detected lateral pressure PDN is too low. Then, since the determination result in step S8 indicates that the lateral pressure PDN is low, the characteristic abnormality detection unit 28*d* establishes that the characteristic abnormality occurs in the lateral pressure sensor 62 also in view of the determination result in step S7.

On the other hand, if the determination result in step S8 is negative (step S8: NO), the characteristic abnormality detection unit 28*d* performs the next step S10.

In step S10, the characteristic abnormality detection unit 28*d* determines whether the determination result in step S6 is "OK", that is, the lateral pressure PDN is in the predetermined range. If the determination result in step S10 is positive (step S10: YES), the process advances to the next step S11.

In step S11, the characteristic abnormality detection unit 28*d* establishes that the characteristic abnormality occurs in the output pressure sensor 26 because the determination result in step S7 indicates that the characteristic abnormality occurs in one of the output pressure sensor 26 and the lateral pressure sensor 62, and because the determination result in step S10 indicates that the characteristic abnormality does not occur in the lateral pressure sensor 62.

In addition, if the determination result in step S10 is negative (step S10: NO), the characteristic abnormality detection unit 28*d* performs the next step S12.

In step S12 in the characteristic abnormality detection unit 28*d*, the determination result in step S7 indicates that the output pressure P1 is too high or the lateral pressure PDN is too low and the determination result in steps S8, S10 indicates that the lateral pressure PDN is high. In the case of such a wrong determination result, the characteristic abnormality detection unit 28*d* determines that the characteristic abnormality does not occur (no abnormality) in either the output pressure sensor 26 or the lateral pressure sensor 62.

On the other hand, if the determination result in step S7 is negative (step S7: NO), the characteristic abnormality detection unit 28*d* performs the next step S13.

In step S13, the characteristic abnormality detection unit 28*d* determines whether the determination result in step S6 indicates "low", that is, PDNβ>PDN in a manner similar to step S8. If the determination result in step S13 is positive (step S13: YES), the process advances to the next step S14.

In step S14 in the characteristic abnormality detection unit 28*d*, the determination result in step S7 indicates that the hydraulic pressure difference ΔP is small because the output pressure P1 is too low or the lateral pressure PDN is too high, and the determination result in step S13 indicates that the lateral pressure PDN is low. In the case of such a wrong determination result, the characteristic abnormality detection unit 28*d* determines that the characteristic abnormality does not occur (no abnormality) in either the output pressure sensor 26 or the lateral pressure sensor 62.

In addition, if the determination result in step S13 is negative (step S13: NO), the characteristic abnormality detection unit 28*d* performs the next step S15.

In step S15, the characteristic abnormality detection unit 28*d* determines whether the determination result in step S6 indicates "OK", that is, the lateral pressure PDN is in the predetermined range in a manner similar to step S10. If the determination result in step S15 is positive (step S15: YES), the process advances to the next step S16.

In step S16, the determination result in step S7 indicates that the hydraulic pressure difference ΔP is small because the output pressure P1 is too low or the lateral pressure PDN is too high and the determination result in step S15 indicates that the lateral pressure PDN is in the predetermined range. Thus, the characteristic abnormality detection unit 28*d* establishes that the characteristic abnormality occurs in the output pressure sensor 26.

If the determination result in step S15 is negative (step S15: NO), the characteristic abnormality detection unit 28*d* performs the next step S17.

In step S17, the determination result in step S7 indicates that the hydraulic pressure difference ΔP is small because the output pressure P1 is too low or the lateral pressure PDN is too high and the determination result in step S15 indicates that the lateral pressure PDN is "high". Thus, the characteristic abnormality detection unit 28*d* establishes that the characteristic abnormality occurs in the lateral pressure sensor 62.

[3. Effect of the Present Embodiment]

As described above, in the hydraulic control device 10 according to the present embodiment, the comparison determination unit 28*b* of the control unit 28 determines whether the characteristic abnormality occurs in at least one hydraulic sensor by comparing the output pressure P1 detected by the output pressure sensor 26 and the lateral pressure PDN detected by the lateral pressure sensor 62. Thus, it is possible to, for example, notify the occurrence of the characteristic abnormality in at least one hydraulic sensor to the outside, and request a repair.

Moreover, the individual determination unit 28*c* of the control unit 28 individually determines whether the output pressure P1 and the lateral pressure PDN are out of the predetermined range. Thus, since whether the output pressure sensor 26 or the lateral pressure sensor 62 as the determination target has the characteristic abnormality can be determined, the hydraulic sensor in which the characteristic abnormality occurs can be individually detected (determined).

In addition, the characteristic abnormality detection unit 28*d* of the control unit 28 determines the hydraulic sensor in which the characteristic abnormality occurs by using the determination results in the comparison determination unit 28*b* and the individual determination unit 28*c*. Thus, in a case where the determination processes in the two determination units are performed in order or at the same time in parallel, the hydraulic sensor in which the characteristic abnormality occurs can be specified (detected) quickly and certainly.

That is to say, in the determination using the detection result of one hydraulic sensor, it is necessary to set a wide threshold range for the determination process in consideration of the variation in determination accuracy. As a result, it is difficult to perform the correct determination unless the characteristic abnormality is relatively large.

On the other hand, by specifying the hydraulic sensor in which the characteristic abnormality occurs by combining two different determination methods (two determination processes for the characteristic abnormality), the threshold range set on the basis of the variation of the determination accuracy can be narrowed and the relatively small characteristic abnormality can be determined correctly.

In addition, in a case where the second pump 30 rotates at the idling rotation number or the second pump 30 is in the stop state, the comparison determination unit 28b and the individual determination unit 28c determine whether the characteristic abnormality occurs.

If the output pressure sensor 26 and the lateral pressure sensor 62 operate normally and have approximately the same performance, the output pressure P1 becomes a hydraulic value that is large by the pressure loss in the hydraulic circuit as compared to the lateral pressure PDN. Therefore, by performing each determination process when the second pump 30 idles or is in the stop state, in which the hydraulic pressure difference ΔP is relatively large, the accuracy of each determination process can be increased and the hydraulic sensor in which the characteristic abnormality occurs can be determined.

The present invention is not limited to the above embodiment and may employ various structures on the basis of the description in the present specification.

What is claimed is:

1. A hydraulic control device including, between a first pump and a hydraulic operation unit of a transmission, a second pump and a check valve connected in parallel and configured to supply first oil from the first pump to the hydraulic operation unit through the check valve, or pressurize the first oil that is supplied from the first pump with the second pump and supply the first oil that has been pressurized to the hydraulic operation unit as second oil, the hydraulic control device comprising:
   a first hydraulic sensor provided between the first pump and the second pump, and configured to detect a pressure value of the first oil discharged from the first pump;
   a second hydraulic sensor provided between the second pump and the hydraulic operation unit, and configured to detect a pressure value of the first oil to be supplied to the hydraulic operation unit from the first pump through the check valve or a pressure value of the second oil to be supplied to the hydraulic oil from the second pump;
   a comparison determination unit configured to determine whether a characteristic abnormality occurs in at least one hydraulic sensor of the first hydraulic sensor or the second hydraulic sensor by comparing the pressure value of the first oil detected by the first hydraulic sensor and the pressure value of the first oil or the second oil detected by the second hydraulic sensor; and
   a line pressure regulation valve provided between the first pump and the second pump, and configured to divide the first oil discharged from the first pump to cause the first oil to flow to the hydraulic operation unit and to a lubrication system of the transmission,
   wherein only the first hydraulic sensor and the check valve are connected between the line pressure regulation valve and the second pump.

2. The hydraulic control device according to claim 1, further comprising an individual determination unit configured to determine whether the characteristic abnormality occurs in the first hydraulic sensor or the second hydraulic sensor as a determination target by individually determining whether the pressure value detected by the first hydraulic sensor or the second hydraulic sensor is out of a predetermined range.

3. The hydraulic control device according to claim 2, further comprising a characteristic abnormality detection unit configured to determine occurrence of the characteristic abnormality in the first hydraulic sensor or the second hydraulic sensor by using each determination result in the comparison determination unit and the individual determination unit.

4. The hydraulic control device according to claim 2, wherein the comparison determination unit and the individual determination unit determine whether the characteristic abnormality occurs in a case in which the second pump rotates at an idling rotation number or the second pump is in a stop state.

* * * * *